United States Patent [19]

Faur et al.

[11] Patent Number: 5,571,385

[45] Date of Patent: Nov. 5, 1996

[54] METHOD AND APPARATUS FOR WATER PURIFICATION

[75] Inventors: Mircea Faur; Maria Faur, both of North Olmsted; David W. Epperly, Mentor, all of Ohio

[73] Assignee: Cleveland State University, Cleveland, Ohio

[21] Appl. No.: 437,897

[22] Filed: May 8, 1995

[51] Int. Cl.$^6$ ............................... B01D 3/42; C02F 1/04
[52] U.S. Cl. .................. 203/10; 159/29; 159/DIG. 1; 202/180; 202/181; 202/196; 202/267.1; 203/100; 203/DIG. 2; 392/325; 392/331; 392/338
[58] Field of Search .................. 203/10, 1, 100, 203/86, DIG. 17, DIG. 18, DIG. 2; 159/DIG. 1, 29, 28.6, 28.1; 202/180, 181, 196, 267.1, 234, 193, 237; 392/325, 497, 331, 338

[56] References Cited

U.S. PATENT DOCUMENTS

| | | | |
|---|---|---|---|
| 3,664,929 | 5/1972 | White et al. ........................... | 203/10 |
| 3,983,359 | 9/1976 | Walker et al. .......................... | 392/318 |
| 4,092,519 | 5/1978 | Eaton-Williams ..................... | 392/338 |
| 4,296,082 | 10/1981 | Lowe et al. ............................ | 159/29 |
| 5,196,093 | 3/1993 | Weber et al. .......................... | 203/10 |
| 5,304,286 | 4/1994 | Palmer .................................. | 203/10 |

FOREIGN PATENT DOCUMENTS

| | | | |
|---|---|---|---|
| 0525850 | 9/1940 | United Kingdom ................... | 392/338 |
| 2183802 | 6/1987 | United Kingdom ................... | 392/338 |

*Primary Examiner*—Virginia Manoharan
*Attorney, Agent, or Firm*—John F. McDevitt

[57] ABSTRACT

A water purification method and apparatus is described which distills a contaminated water supply having contaminants dissolved therein with electrically powered spaced apart immersion electrodes. When connected to a source of alternating electrical current, the electrode members cooperate to distill water by heating while concurrently removing the contaminants as solid precipitates in the contaminated remaining water.

4 Claims, 5 Drawing Sheets

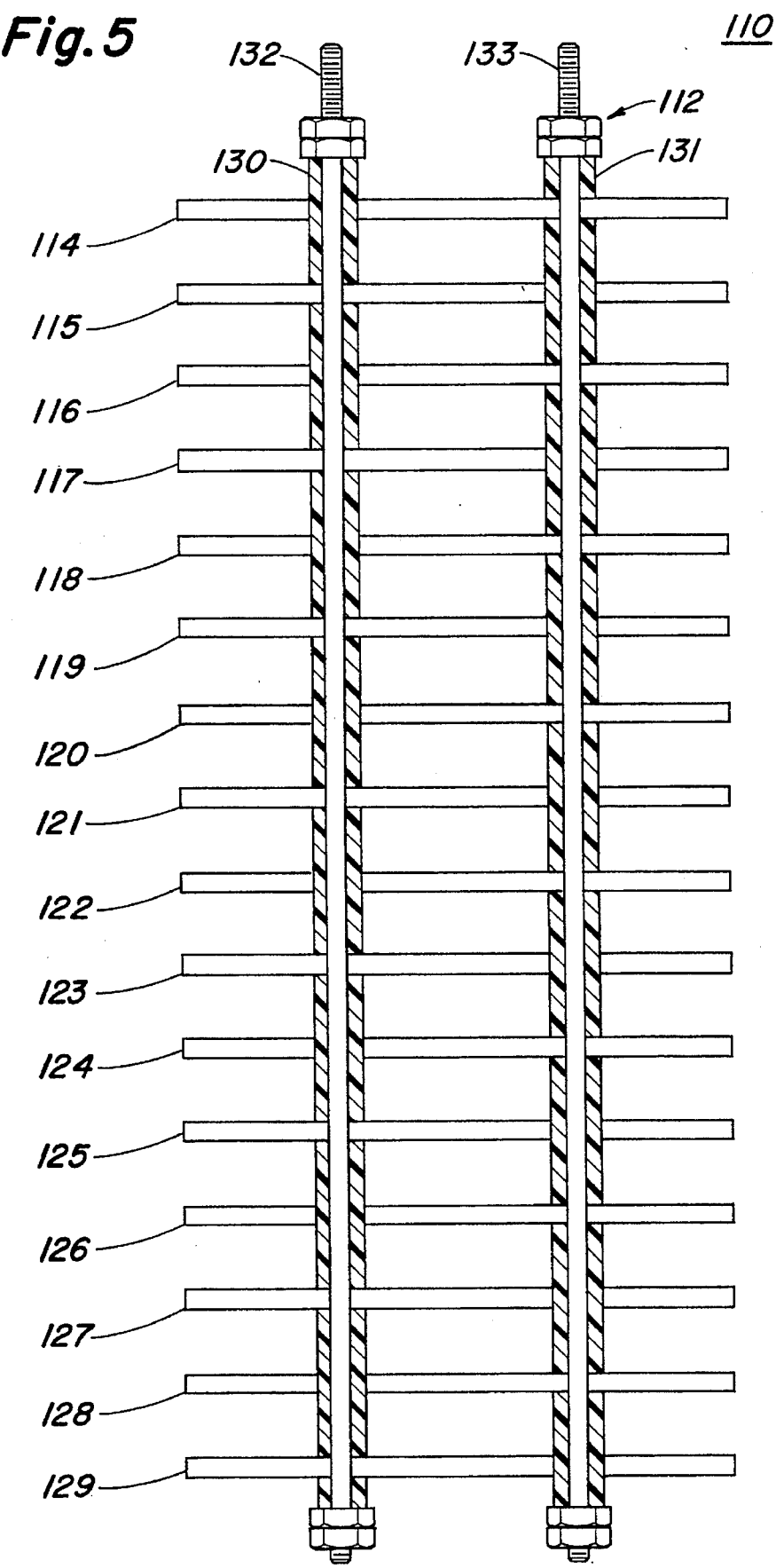

1

METHOD AND APPARATUS FOR WATER PURIFICATION

BACKGROUND OF THE INVENTION

This invention relates generally to water purification and more particularly, to a novel method and apparatus for removing dissolved contaminants from a contaminated water supply with electrically powered immersion electrodes.

Distillation has long been a commonly employed technique for water purification by removing a broad range of impurities from a contaminated water supply. In doing so, the raw water supply, including ordinary potable tap water, is boiled in a first container for its separation from the contaminated water supply and the purified water vapor thereafter recondensed to the liquid state, generally in a separate second container or vessel. Electrical heating of the contaminated water supply is also well known with resistive type immersion electrodes being employed. While water purity as measured by specific electrical resistance up to 2 megohm-centimeters can be produced in this manner, eventual precipitation of contaminants in the boiling vessel takes place requiring frequent cleaning to restore operating efficiency. The precipitated solids which accumulate on the resistive electrodes being employed have to be removed causing frequent disassembly of the overall apparatus.

It remains desirable, therefore, to provide still more effective means whereby contaminants can be removed from a contaminated water supply employing distillation while not further requiring elaborate modification of the now commonly employed method and apparatus for doing so.

It is an important object of the present invention to provide novel immersion electrode means for improved water purification.

It is another object of the present invention to provide a distillation a apparatus employing such novel immersion electrode means for more effective removal of contaminants from a contaminated water supply.

A still further object of the present invention is to provide a novel method for the removal of contaminants from a contaminated water supply which employs the present electrode means.

These and further objects of the present invention will become more apparent upon considering the following detailed description of the present invention.

SUMMARY OF THE INVENTION

It has now been discovered, surprisingly, that more effective immersion electrode means can be provided for an electrically heated distillation apparatus to remove contaminants from a contaminated water source. More particularly, both higher water purity and reduced maintenance of the apparatus is now provided with spaced apart electrodes members immersed in the contaminated water and each electrically connected to a sufficient source of alternating electrical current for the water distillation while concurrently causing the contaminants to simply settle in the remaining contaminated water as solid precipitates. In a typical apparatus, the modified immersion electrode means employs a single pair of physically separated conductive metal plates to provide the needed heating for water distillation while further cooperating to produce contaminant precipitation without significant coating of the metal plates. Both organic and inorganic contaminants are effectively removed in this manner to the degree that purified water exhibiting electrical resistivity from 4–5 megohm-centimeter can be recovered upon condensation of the distilled water product. A prototype distillation apparatus having such construction provided approximately 750 gallons of purified water during a six months test period while only requiring twenty minutes of cleaning during the entire time interval.

While the exact mechanism whereby such spaced apart electrodes substantially avoid coating of the electrode surfaces in the present apparatus has not been fully investigated at this time, it is believed attributable to causing current flow between the electrically connected electrode members. Thus, having the electrode pair connected between an alternating current power source enables electric current to pass through the contaminated water volume therebetween causing both heating of the water while having both inorganic and organic contaminants become positively and negatively charged ions. Owing to the combined effect of water distillation and separation of the contaminant ions attributable to such electric field, the ionized contaminates thereafter become discharged at the electrode members for eventual settling as solid sediment in the base region of the distillation vessel.

In one preferred embodiment, the present water purification apparatus comprises (a) container means in which contaminated water having contaminants dissolved therein is distilled therefrom by internal heating means, (b) the internal heating means being spaced apart electrode members immersed in the contaminated water and electrically connected to a sufficient source of alternating electrical current for the water distillation while concurrently causing the dissolved contaminants to be removed as sediment in the remaining contaminated water, and (c) condenser means operatively associated with the container means for converting the distilled water to a liquid state. The illustrated apparatus can further include liquid storage means physically associated with the condenser means for recovery of the condensed water product. Likewise, the container means in the illustrated apparatus can be connected to a continuous supply of contaminated water in order to maintain a continuous mode of operation. Further employing conventional means to maintain a constant liquid level in the apparatus, such as by having simple mechanical float means provided in a liquid storage vessel supplying contaminated water continuously for distillation, affords additional improvement. In a different regard, the conventional apparatus employing resistive heating only are found to commonly employ electrical cut-off means avoiding overheating of the apparatus if the water supply thereto should become interrupted. Since absence of water in the present apparatus does not occasion overheating, however, it now becomes possible to still further eliminate such control means in the present apparatus.

In a different form of the present invention, multiple pairs of the spaced apart electrode members can be electrically interconnected to an alternating current power source for additional benefits. Adjustment of the distilled water rate can be provided in this manner while further enabling the electrical heating to be carried out over a larger physical region of the distillation vessel. Additionally, such dispersion of the heating medium in the distillation vessel can reduce a contamination of the distilled water vapor with volatile contaminants formed during distillation. A representative multiple electrode assembly having electrode pairs connected in parallel to the power source is provided with a vertical orientation of the spaced apart conductive metal plates having alternate plates electrically connected in common to one side of the power source while having physically adjoining plates electrically connected in common to the remaining side of said power source. A different representative multiple electrode assembly having the electrode pairs connected in parallel is provided with a horizontal orientation of the spaced apart conductive metal plates but again having physically adjoining plates electrically connected in common to opposite sides of the power source.

BRIEF DESCRIPTION OF THE DRAWINGS

FIG. 5 is another side view for a different multiple electrode assembly of the present invention.

DETAILED DESCRIPTION OF THE PREFERRED EMBODIMENTS

Figure 1:
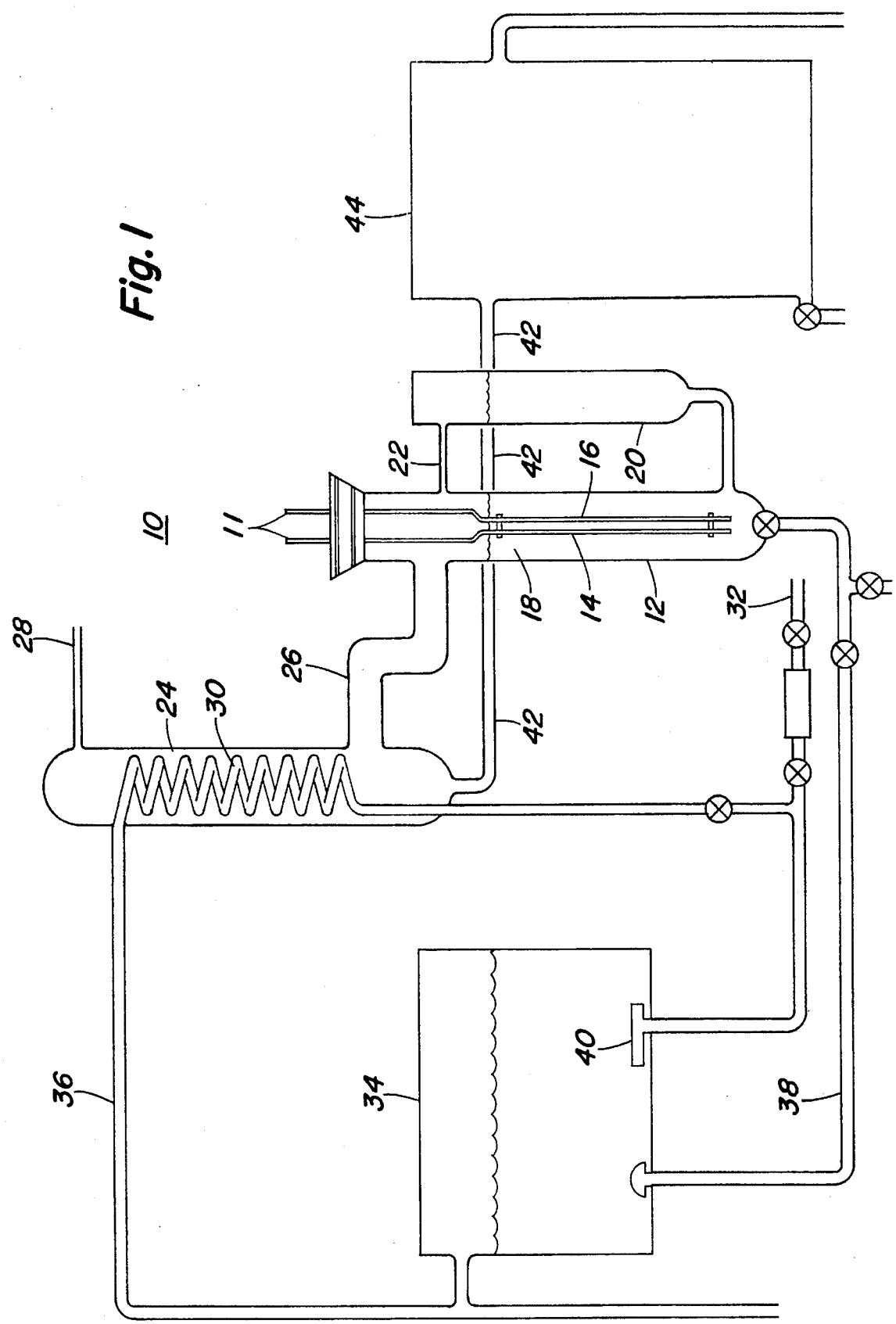
FIG. 1 is a front view depicting a typical glass distillation apparatus providing water purification according to the present invention.

Referring to the drawings, FIG. 1 is a representative glass distillation apparatus employing a single pair of spaced apart electrode members 11 for the water distillation is depicted. More particularly, the illustrated apparatus 10 includes an open-ended glass flask or vessel 12 having centrally disposed electrode members 14 and 16 for immersion in a volume of the raw water 18 being continuously supplied thereto at a relatively constant liquid level. Vent means 20 and 22 in said glass vessel enable the distillation to be carried out therein at ambient atmospheric pressure. A second glass flask or vessel 24 is physically connected to the distillation vessel 12 via passageway 26 while also being vented to the atmosphere at opening 28 provides condensation of the distilled water vapor with a cooling coil 30 contained therein. The cooling is effected with raw water again being continuously supplied to said cooling coil from a conventional source of potable tap water 32 which further supplies such still contaminated water source to ancillary container means 34 for storage at the same liquid level being maintained in the distillation vessel 12. Conduit 36 also enable excess water to drain from said container. As can further be seen in the present drawing, the raw water is admitted jointly to the storage container 34 as well as cooling coil 30 while also being removed therefrom for supply of the distillation vessel 12 via connecting conduit means 38. Conventional mechanical float means 40 disposed in the liquid storage vessel 34 automatically regulates the water level at approximately the same height in both storage vessel 34 and distillation vessel 12. The purified water condensate (not shown) continuously emerges from the base end of condenser vessel 24 for passage in liquid conduit 42 to a still further storage vessel 44.

Figure 2:
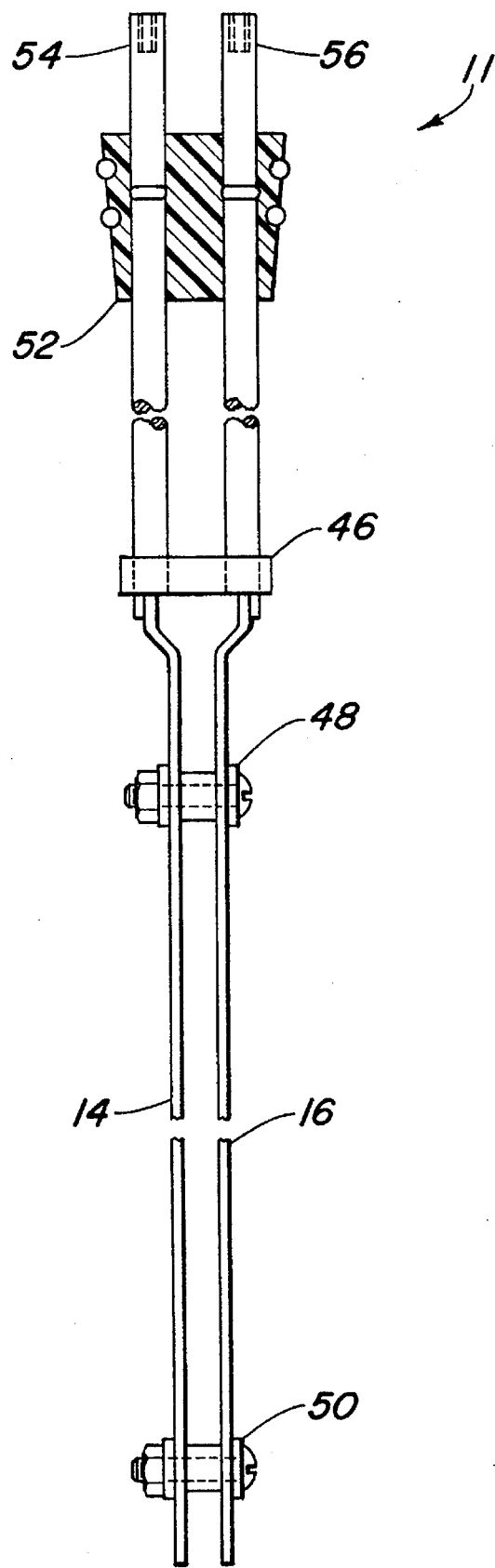
FIG. 2 is an enlarged view showing more structural details of the electrode means employed in the FIG. 1 apparatus.

In FIG. 2 there is shown an enlarged view of the electrode assembly 11 being employed in the FIG. 1 distillation apparatus. As herein depicted, said electrode assembly employs spaced apart conductive metal plates 14 and 16 facing each other while being physically joined with insulative spacer means 46, 48 and 50 to establish electrical isolation therebetween. Elastomeric stopper means 52 are further provided at one end of the electrode assembly enabling its removable attachment to the open end of distillation vessel 12 for cleaning purposes. The protruding ends 54 and 56 of the respective electrode members are electrically connected by conventional means to opposite sides of a customary alternating current power source (not shown). Stainless steel construction of the individual electrode members enable long term continuous operation of the distillation apparatus as above pointed out with synthetic fluorine containing polymer material being employed for construction of the spacer and stopper means in the illustrated embodiment.

Figure 3:
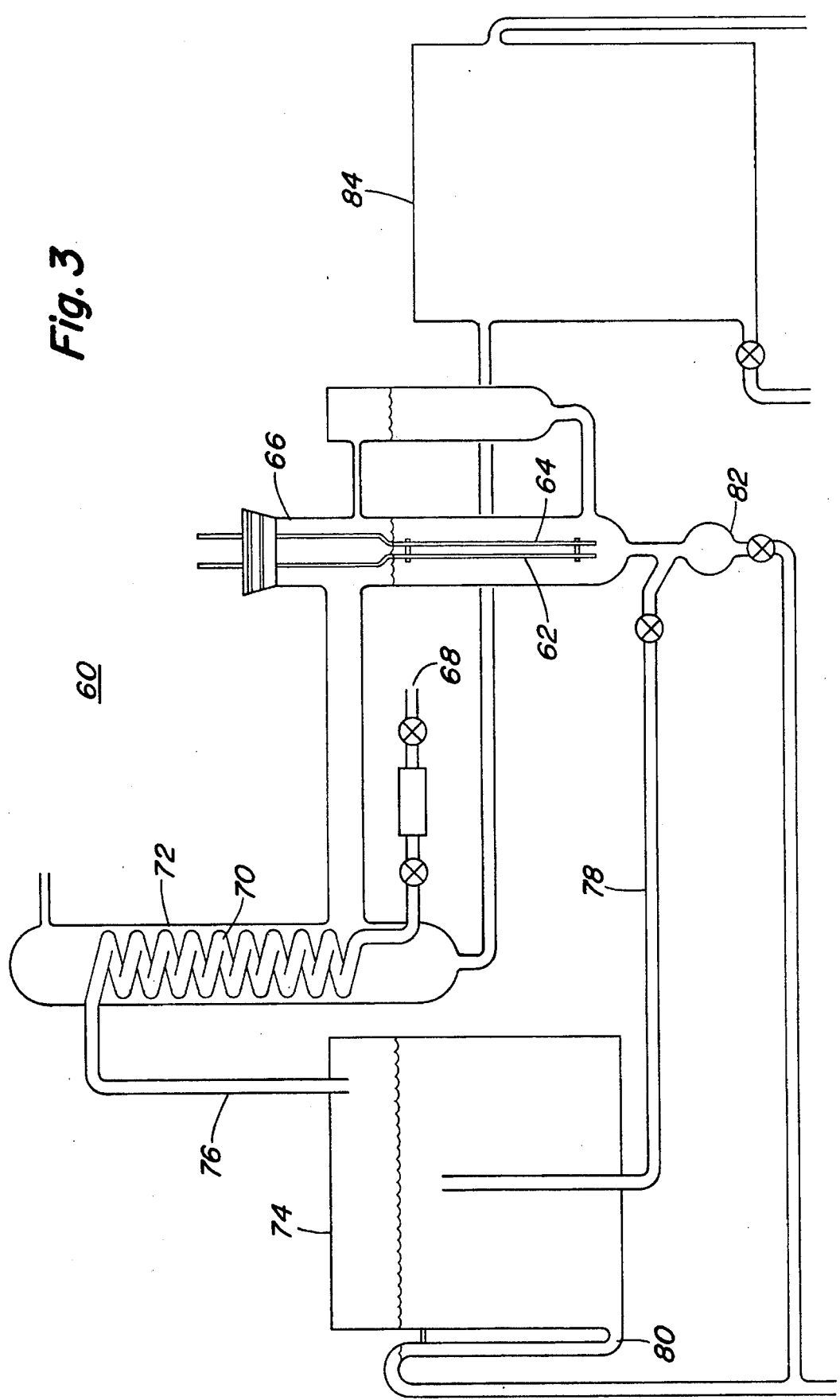
FIG. 3 is another front view for a different distillation apparatus constructed in accordance with the present invention.

FIG. 3 is side view depicting a structural modification for a representative distillation apparatus of the present invention exhibiting greater heating efficiency than hereinbefore described. As herein depicted, glass distillation apparatus 60 again employs a single pair of spaced apart electrode members 62 and 64 physically immersed in contaminated water being supplied to distillation vessel 66. Likewise, the raw water is again being supplied from a conventional source 68 to a cooling coil 70 disposed within a condenser vessel 72. As distinct from the previously described FIG. 1 apparatus, however, wherein the raw water being supplied is further admitted to the bottom of an auxiliary storage container (member 34), there is now provided a dissimilar means for introducing raw water to the distillation vessel 66 in the present apparatus. The raw water supply enters auxiliary storage container 74 in the present apparatus only after being heated in coil 70 and being subsequently discharged by liquid conduit means 76 to an upper region in said storage container where water resides at an elevated temperature. As can also be seen in the present drawing, now preheated, raw water is withdrawn from said upper region of the storage container for transfer to distillation vessel 66 via liquid conduit means 78. It follows that introducing preheated water for subsequent distillation reduces the amount of heating energy required for operation of the apparatus. Excess water is drained from the bottom region of the present storage container through constant level overflow conduit means 80. Additionally, employment of discharge means 82 at the bottom end of distillation vessel 66 enables a removal of precipitated sediment therefrom without requiring the apparatus to be disassembled. As can still be further seen in the present drawing, the present apparatus also includes a liquid storage vessel 84 for retention of the purified water condensate (not shown) being discharged at the base end of condenser vessel 72.

Basic operation in both of the above described apparatus embodiments proceeds in the same general manner for water purification. Accordingly, the contaminated water is first admitted to the distillation vessel in an amount sufficient to immerse the electrode members, then distilled therefrom with heating by the electrode members when supplied with alternating current while concurrently precipitating dissolved contaminants in the remaining contaminated water, and finally condensing the distilled purified water product. Heating of the electrodes with alternating current at ordinary household voltage satisfies the electrical energy requirements for many lower volume product applications. The present method can be continuously carried out at ambient atmospheric pressure upon supplying the distillation vessel continuously with a volume of contaminated water keeping the electrode members immersed. In one form of the invention, the contaminated water supply provides the cooling medium for purified water condensation while said contaminated water supply can also be preheated prior to distillation in another form of the present method. Additionally, the employment of a single pair of the electrode members enables the present method to be carried out effectively although a use of multiple electrode pairs is found to afford still further operational advantages.

Figure 4:
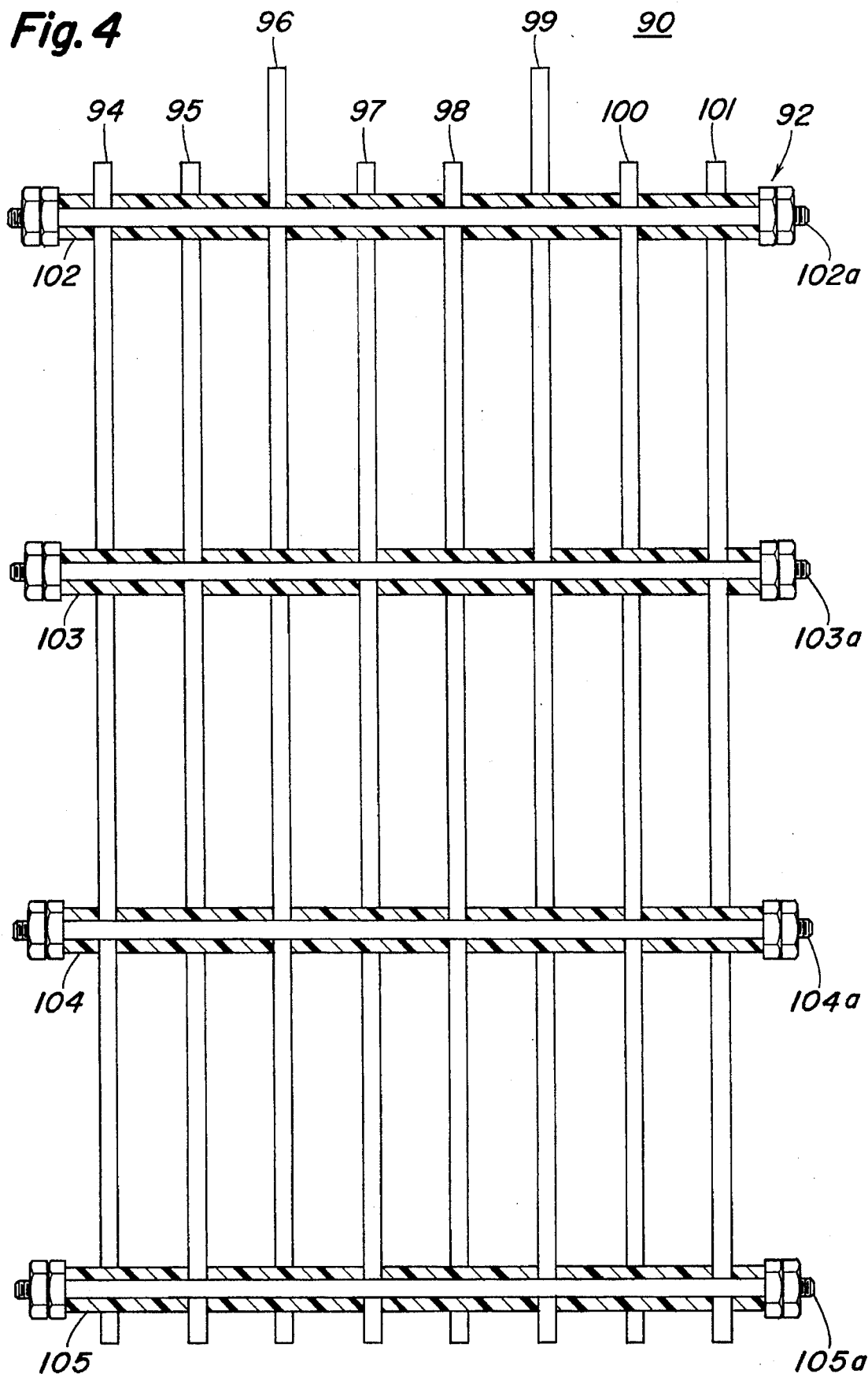
FIG. 4 is side view showing a representative multiple electrode assembly according to the present invention.

FIG. 4 is a side view depicting a representative multiple electrode assembly of the present invention enabling four pair of the electrically interconnected electrode members to provide current flow between each pair of electrodes upon connecting the assembly to a common source of alternating current. Structural configuration of the depicted electrode assembly 90 consists of a frame member 92 physically securing the eight individual conductive metal electrode plates 94–101 together in a spaced apart vertical orientation with horizontal spacer means 102–105 being disposed therebetween. Such spacer means are constructed with electrical insulative material, such as synthetic fluorine containing polymer, for electrical isolation between adjoining electrode members while further enabling electrical interconnection of selected electrode members in the manner depicted. The depicted electrode interconnection is achieved with auxiliary conductive metal rods 102a–105a being surrounded by the electrically insulative polymer except at the interconnection sites and with said interconnection further being made in a sequential manner enabling parallel connection of the electrode rods 94–101 to the power source (not shown). A protrusion of electrode plates 96 and 99 from the frame 92 enables electrical connection to the power source by conventional means.

In FIG. 5 there is shown a side view for a different representative multiple electrode assembly of the present invention again providing parallel electrical connection of the depicted electrode pairs to a common source of alternating current. More particularly, the herein depicted electrode assembly 110 again has a frame member configuration 112 holding a plurality of horizontally oriented conductive metal electrode plates 114–129 together in a spaced apart relationship with vertically oriented insulative spacer means 130 and 131 being disposed therebetween. As can be seen in the present drawing, such spacer means each further include auxiliary conductive metal rods 132 and 133, respectively, for parallel electrical interconnection of adjoining electrode pairs to the power source (not shown). Again, protrusion of said auxiliary metal rods from the frame member 112 provides means for electrical connection to the power source by conventional means.

It will be apparent from the foregoing description that broadly useful means have been provided to purify water upon distilling a contaminated water supply with electrically heated immersion electrodes in an improved manner. It is contemplated that such improved water purification can likewise be carried out in a broad class of distillation apparatus other than above illustrated, however, to include both glass and metal construction of the apparatus as well as further including auxiliary purification means such as filters, deionization means and the like. Similarly, different electrode constructions than above herein specifically illustrated are contemplated to provide a means whereby spacing apart of the individual electrode members when energized with alternating electrical current enables current flow therebetween in the contaminated water medium. It is still further contemplated that improved distillation of contaminated water with the present immersion electrode means can be carried out by a different method than herein specifically disclosed. Consequently, it is intended to limit the present invention only by the scope of the appended claims.

What we claim as new and desire to secure by Letters patent of the United States is:

1. A water purification apparatus to continuously remove dissolved contaminants from potable tap water which comprises:

(a) a glass flask from which the potable tap water is continuously distilled with internal heating means, (b) the internal heating means having spaced apart electrode members comprising stainless steel plates immersed in the potable tap water and electrically connected to an alternating electrical current power source for producing purified water vapor while concurrently causing the dissolved contaminants to be removed thereat as precipitates in the remaining potable tap water without significant coating of the immersed electrode members, (c) condenser means connected to the glass flask for converting the purified water vapor to a liquid state exhibiting electrical resistivity no less than 4–5 megohm-centimeters.

(d) liquid storage means connected to the glass flask while also being connected to a continuous potable tap water supply, (e) liquid level means being contained in the liquid storage means so as to maintain a constant liquid level in both the liquid storage means and the glass flask, and (f) the continuous potable tap water supply further providing means for a cooling medium to be supplied into the condenser means.

2. A method of removing dissolved contaminants from a potable tap water supply which comprises:

(a) continuously supplying the potable tap water to a glass flask having internal spaced apart stainless steel electrode members in an amount sufficient to immerse the electrode members, (b) continuously producing purified water vapor upon heating by the immersed electrode members when supplied with a source of alternating electric current, (c) concurrently precipitating the dissolved contaminants in the remaining potable tap water by further action of the immersed electrode members without significant coating of the immersed electrode members, (d) continuously condensing the purified water vapor with a cooling medium provided by the potable tap water supply to produce a liquid exhibiting electrical resistivity no less that 4–5 megohm-centimeters, and (e) collecting the condensed liquid in liquid storage means provided with liquid level means so as to maintain a constant liquid level in both the liquid storage means and the glass flask.

3. The method of claim 2 wherein the spaced apart electrode members comprise a single pair of stainless steel plates.

4. The method of claim 2 wherein the spaced apart electrode members comprise multiple pairs of stainless steel plates.

* * * * *